United States Patent
Wade

(10) Patent No.: US 10,380,389 B1
(45) Date of Patent: Aug. 13, 2019

(54) READING PAYMENT OBJECT UPON DETECTION OF READER READINESS

(71) Applicant: Square, Inc., San Francisco, CA (US)

(72) Inventor: Jeremy Wade, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 15/650,713

(22) Filed: Jul. 14, 2017

Related U.S. Application Data

(63) Continuation of application No. 14/967,108, filed on Dec. 11, 2015, now Pat. No. 9,721,123.

(51) Int. Cl.
| | |
|---|---|
| *G06K 7/00* | (2006.01) |
| *G06K 7/08* | (2006.01) |
| *G06K 7/01* | (2006.01) |
| *G06Q 20/34* | (2012.01) |

(52) U.S. Cl.
CPC ............ *G06K 7/0034* (2013.01); *G06K 7/01* (2013.01); *G06K 7/084* (2013.01); *G06Q 20/352* (2013.01)

(58) Field of Classification Search
CPC .... G06Q 20/34; G06Q 20/341; G06Q 20/352; G06K 7/00; G06K 7/0034; G06K 7/01; G06K 7/08; G06K 7/084
See application file for complete search history.

(56) References Cited

U.S. PATENT DOCUMENTS

| | | | |
|---|---|---|---|
| 4,150,784 A | 4/1979 | Moorman et al. | |
| 5,798,507 A | 8/1998 | Kawagishi et al. | |
| 6,098,888 A | 8/2000 | Praden | |
| 6,378,073 B1 | 4/2002 | Davis et al. | |
| 6,426,944 B1 | 7/2002 | Moore | |
| 6,702,182 B1 * | 3/2004 | Kanayama | G06K 7/0021 235/380 |
| 7,370,804 B2 | 5/2008 | Ishii | |
| 7,712,670 B2 | 5/2010 | Sauerwein, Jr. et al. | |
| 9,088,403 B1 | 7/2015 | Caggioni et al. | |
| 9,092,766 B1 | 7/2015 | Bedier et al. | |
| 9,286,494 B1 | 3/2016 | Lamfalusi et al. | |
| 9,317,848 B2 | 4/2016 | Hammad | |

(Continued)

FOREIGN PATENT DOCUMENTS

| | | |
|---|---|---|
| CA | 2 968 660 A1 | 5/2016 |
| EP | 1 431 861 A2 | 6/2004 |

(Continued)

OTHER PUBLICATIONS

Ex Parte Quayle Action mailed Jan. 26, 2017, for U.S. Appl. No. 14/967,108, of Wade, J., filed Dec. 11, 2015.

(Continued)

*Primary Examiner* — Laura A Gudorf
(74) *Attorney, Agent, or Firm* — Polsinelli PC

(57) ABSTRACT

A payment object reader configured to delay reading data of an integrated circuit payment object in the payment object slot of the payment object reader until the rest of the payment object reader is ready to read data off of the integrated circuit payment object. The payment object reader can be configured to include a microcontroller configured to monitor and manage the payment object contact switch and the integrated circuit payment object interface of the payment object slot of the payment object reader.

20 Claims, 9 Drawing Sheets

(56) References Cited

U.S. PATENT DOCUMENTS

| | | |
|---|---|---|
| 9,424,445 B2 | 8/2016 | Lamfalusi et al. |
| 9,652,641 B2 | 5/2017 | Lamfalusi et al. |
| 9,721,123 B1 | 8/2017 | Wade |
| 9,760,743 B2 | 9/2017 | Lamfalusi et al. |
| 9,858,448 B1 | 1/2018 | Terra et al. |
| 10,002,268 B1 | 6/2018 | Terra et al. |
| 10,318,952 B1 | 6/2019 | Wade et al. |
| 2001/0029595 A1 | 10/2001 | Murata |
| 2002/0060249 A1 | 5/2002 | Perron |
| 2003/0067940 A1 | 4/2003 | Edholm |
| 2004/0124246 A1 | 7/2004 | Allen et al. |
| 2005/0156026 A1 | 7/2005 | Ghosh et al. |
| 2005/0184164 A1 | 8/2005 | De Jong |
| 2006/0192542 A1 | 8/2006 | Uguen |
| 2007/0012763 A1 | 1/2007 | Van de Velde et al. |
| 2007/0260638 A1 | 11/2007 | Madsen et al. |
| 2008/0189547 A1 | 8/2008 | Sugiyama |
| 2008/0238679 A1 | 10/2008 | Rofougaran et al. |
| 2008/0245851 A1 | 10/2008 | Kowalski |
| 2008/0301030 A1 | 12/2008 | Boss et al. |
| 2008/0301050 A1 | 12/2008 | DiGioacchino |
| 2009/0006262 A1 | 1/2009 | Brown et al. |
| 2009/0043918 A1 | 2/2009 | Schroeder |
| 2009/0132852 A1 | 5/2009 | Sekiya |
| 2009/0283600 A1 | 11/2009 | Chang et al. |
| 2010/0224684 A1* | 9/2010 | Bonnin ............ G06K 7/0008 235/441 |
| 2010/0252624 A1 | 10/2010 | Van de Velde et al. |
| 2010/0253482 A1 | 10/2010 | Catala Mora et al. |
| 2011/0179494 A1 | 7/2011 | Adams et al. |
| 2011/0244799 A1 | 10/2011 | Roberts et al. |
| 2012/0017106 A1 | 1/2012 | Curren et al. |
| 2012/0126009 A1 | 5/2012 | Osen et al. |
| 2012/0159207 A1 | 6/2012 | Chao et al. |
| 2012/0166344 A1 | 6/2012 | Cheng et al. |
| 2012/0173817 A1 | 7/2012 | Jiang et al. |
| 2012/0185397 A1 | 7/2012 | Levovitz |
| 2012/0215830 A1 | 8/2012 | Anguiano |
| 2012/0226601 A1 | 9/2012 | Cole et al. |
| 2013/0006847 A1 | 1/2013 | Hammad et al. |
| 2013/0095755 A1 | 4/2013 | Moreton et al. |
| 2013/0248601 A1 | 9/2013 | Liang et al. |
| 2013/0299574 A1 | 11/2013 | Theobald |
| 2014/0052637 A1* | 2/2014 | Jooste ............... G06Q 20/32 705/44 |
| 2014/0127995 A1 | 5/2014 | Hendricksen et al. |
| 2014/0189359 A1 | 7/2014 | Marien et al. |
| 2014/0217169 A1* | 8/2014 | Lewis .............. G07F 19/201 235/379 |
| 2014/0289465 A1 | 9/2014 | Suduo |
| 2014/0331072 A1 | 11/2014 | Osen et al. |
| 2016/0117529 A1 | 4/2016 | Bedier et al. |
| 2016/0117659 A1 | 4/2016 | Bedier et al. |
| 2016/0117662 A1 | 4/2016 | Bedier et al. |
| 2016/0306977 A1 | 10/2016 | Zarakas et al. |
| 2016/0307189 A1 | 10/2016 | Zarakas et al. |
| 2017/0028693 A1 | 2/2017 | Free et al. |
| 2017/0242961 A1 | 8/2017 | Shukla et al. |
| 2018/0189771 A1 | 7/2018 | Terra |
| 2018/0189772 A1 | 7/2018 | Terra |
| 2018/0218181 A1 | 8/2018 | Terra et al. |
| 2018/0240103 A1 | 8/2018 | Rezayee et al. |
| 2018/0240117 A1 | 8/2018 | Rezayee et al. |

FOREIGN PATENT DOCUMENTS

| | | |
|---|---|---|
| WO | 01/01300 A1 | 1/2001 |
| WO | 2009/149715 A1 | 12/2009 |
| WO | 2013/051032 A1 | 4/2013 |
| WO | 2015/001468 A1 | 1/2015 |
| WO | 2016/081804 A1 | 5/2016 |
| WO | 2018/125808 A1 | 7/2018 |
| WO | 2017245444 A1 | 7/2018 |
| WO | 2018/144591 A1 | 8/2018 |
| WO | 2018/156742 A1 | 8/2018 |

OTHER PUBLICATIONS

Notice of Allowance dated Mar. 22, 2017, for U.S. Appl. No. 14/967,108, of Wade, J., filed Dec. 11, 2015.
Non-Final Office Action dated Sep. 16, 2015, for U.S. Appl. No. 14/549,338, of Lamfalusi, M.C., et al., filed Nov. 20, 2014.
Notice of Allowance dated Nov. 10, 2015, for U.S. Appl. No. 14/549,338, of Lamfalusi, M.C., et al., filed Nov. 20, 2014.
Non-Final Office Action dated Jan. 14, 2016, for U.S. Appl. No. 14/947,162, of Lamfalusi, M.C., et al., filed Nov. 20, 2015.
Notice of Allowance dated Mar. 25, 2016, for U.S. Appl. No. 14/947,162, of Lamfalusi, M.C., et al., filed Nov. 20, 2015.
Non-Final Office Action dated Aug. 25, 2016, for U.S. Appl. No. 15/220,262, of Lamfalusi, M.C., et al., filed Jul. 26, 2016.
Non-Final Office Action dated Aug. 25, 2016, for U.S. Appl. No. 15/221,383, of Lamfalusi, M.C., et al., filed Jul. 27, 2016.
Notice of Allowance dated Jan. 5, 2017, for U.S. Appl. No. 15/220,262, of Lamfalusi, M.C., et al., filed Jul. 26, 2016.
Non-Final Office Action dated Apr. 12, 2017, for U.S. Appl. No. 15/396,609, of Terra, D., filed Dec. 31, 2016.
Notice of Allowance dated Apr. 21, 2017, for U.S. Appl. No. 15/221,383, of Lamfalusi, M.C., et al., filed Jul. 27, 2016.
Notice of Allowance dated Aug. 23, 2017, for U.S. Appl. No. 15/420,730, of Terra, D., et al., filed Jan. 31, 2017.
Final Office Action mailed Nov. 15, 2017, for U.S. Appl. No. 15/396,609, of Terra, D., filed Dec. 31, 2016.
Examination Report No. 1 for Australian Patent Application No. 2017245444, dated Dec. 1, 2017.
Notice of Allowance dated Feb. 5, 2018, for U.S. Appl. No. 15/421,373, of Terra, D., et al., filed Jan. 31, 2017.
Examiner Requisition for Canadian Patent Application No. 2,968,660, dated Mar. 2, 2018.
Non-Final Office Action dated Jul. 19, 2018, for U.S. Appl. No. 15/824,945, of Terra, D., et al., filed Nov. 28, 2017.
Non-Final Office Action dated Jul. 26, 2018, for U.S. Appl. No. 14/868,221, of Wade, J., et al., filed Sep. 28, 2015.
Non-Final Office Action dated Aug. 13, 2018, for U.S. Appl. No. 15/396,609, of Terra, D., filed Dec. 31, 2016.
Notice of Acceptance for Australian Patent Application No. 2017245444, dated Aug. 29, 2018.
International Search Report and Written Opinion for International Application No. PCT/US2015/061771 dated Jan. 29, 2016.
International Search Report and Written Opinion for International Application No. PCT/US2017/068220, dated Apr. 10, 2018.
International Search Report and Written Opinion for International Application No. PCT/US2018/016219, dated Apr. 30, 2018.
International Search Report and Written Opinion for International Application No. PCT/US2018/019191, dated May 30, 2018.
Notice of Allowance dated Nov. 15, 2018, for U.S. Appl. No. 15/824,945, of Terra, D., et al., filed Nov. 28, 2017.
Notice of Allowance dated Dec. 28, 2018, for U.S. Appl. No. 14/868,221, of Wade, J., et al., filed Sep. 28, 2015.
Rueter, T., "Contactless EMV: A Work in Progress: Both EMV and contactless payment are gaining ground. Work or a single contactless EMV standard has begun, but until it is complete, the major card organizations are making their own choices", Card Technology SourceMedia, Inc (Year: 2006), pp. 1-4.
Notice of Allowance dated Mar. 26, 2019, for U.S. Appl. No. 15/396,609, of Terra, D. et al., filed Dec. 31, 2016.
Notice of Allowance dated May 31, 2019, for U.S. Appl. No. 15/439,708, of Rezayee, A., et al., filed Feb. 22, 2017.

\* cited by examiner

READING PAYMENT OBJECT UPON DETECTION OF READER READINESS

CROSS-REFERENCE TO RELATED APPLICATIONS

This application is a continuation of U.S. patent application Ser. No. 14/967,108, entitled "MICROCONTROLLER INTERCEPT OF EMV CARD CONTACT SWITCH", filed on Dec. 11, 2015; which is hereby expressly incorporated herein by reference in its entirety.

BACKGROUND

A payment object reader can be configured to automatically read data from an integrated circuit payment object that has been inserted in the payment object slot of the payment object reader. When the payment object reader detects the presence of the integrated circuit payment object in the payment object slot, a voltage is applied to the integrated circuit payment object in order for the payment object reader to read data from the integrated circuit payment object. However if the system of the payment object reader is not be ready to read data from the integrated circuit payment object, when the integrated circuit payment object is inserted in the payment object slot, then power is wasted or worse yet, synchronization and reading errors can occur.

BRIEF DESCRIPTION OF THE DRAWINGS

In order to describe features of the disclosure, a more particular description of the presently described technology will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

System, devices, methods, and non-transitory computer-readable media are disclosed in accordance with various embodiments of the present disclosure overcome one or more of the above-referenced and other deficiencies in conventional approaches to payment object reader systems. In particular, in accordance with various embodiments, approaches provide for a microcontroller intercept of an integrated circuit payment object contact switch.

A payment object reader includes an intercepting microprocessor configured to delay the reading of data of the payment object (e.g. a credit card or debit card) in the payment object slot of the payment object reader (e.g. card reader). The intercepting microprocessor monitors the system of the payment object reader. If the system is not ready to read the payment object, the intercepting microprocessor can delay the reading of the payment object in the payment object slot, until the system of the payment object reader is ready. For example, if the card reader is not ready to read a credit card inserted into the card reader, the intercepting microprocessor can delay the reading of the credit card, until the system of the card reader is ready. In some embodiments, the payment object can be an integrated circuit card, such as an EMV smart card, the reading of which requires adherence to a multiple step protocol (EMV standard). In such embodiments it is important that the payment object reader be ready to the payment object by initiating reading at the first step of the multiple step protocol. The present technology can delay reading of the payment object until any necessary subsystems are ready to read the payment object.

Other advantages, variations, and functions are described and suggested below as can be provided in accordance with the various embodiments.

As used herein, a financial transaction is a transaction that is conducted between a customer and a merchant at a point-of-sale. When paying for a financial transaction, the customer can provide the merchant with cash, a check, or a debit or credit card for the amount that is due. The merchant can interact with a point-of-sale device, e.g., merchant device, to process the financial transaction. During financial transactions, the point-of-sale device can collect data describing the financial transaction, including, for example, the amount of payment received from customers.

Figure 1:
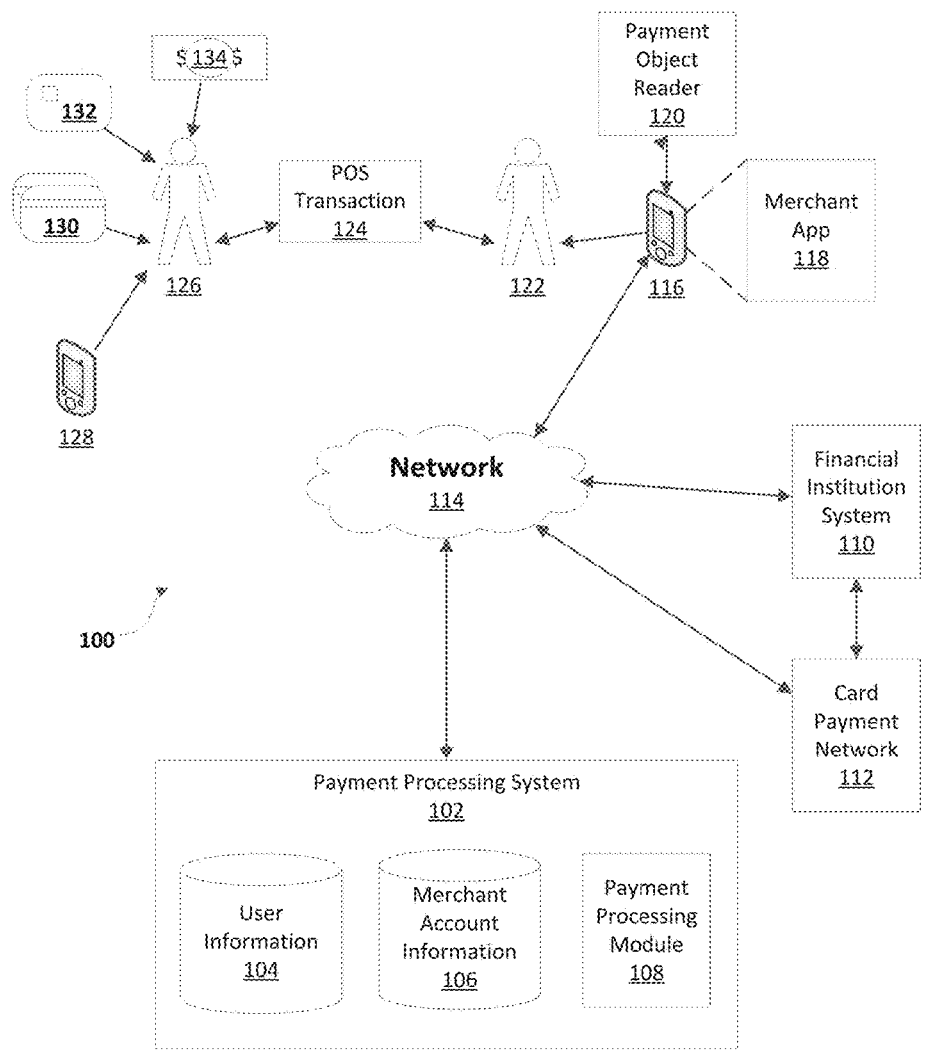
FIG. 1 illustrates an example architecture of a payment communication system for enabling transactions between merchants and buyers.

FIG. 1 illustrates an example architecture of payment communication system 100 for enabling point-of-sale (POS) transactions between merchants 122 and buyers 126. In the example of FIG. 1, buyer 126 can use any of a variety of payment objects, such as payment cards 130, 132 or cash 134 when participating in POS transaction 124 with a merchant 122. A buyer 126 can typically have payment cards 130, 132 such as credit cards, debit cards, prepaid cards, and the like, that buyer 126 can use for conducting POS transaction 124. In some embodiments, payment cards 130 can include one or more magnetic stripes for providing payment object and buyer information when swiped in a payment object reader 120 communicatively coupled to merchant device 116. In some embodiments, other types of payment objects can be used, for example smart cards 132 having a built in integrated circuit including a memory chip (e.g. EMV payment objects), a radio frequency identification tag (e.g. near field communication enabled objects), and the like. In some embodiments, user 126 can use user device 128 to conduct NFC payment transactions through communication between the user device 128 and the payment object reader/transmitter device 120.

The payment communication system 100 in the example of FIG. 1 illustrates a merchant device 116 associated with the merchant 122 that participates in the payment service provided by the service provider of payment processing system 102. The merchant device 116 can be a computing device (e.g., a mobile computing device) able to communicate with the payment processing system 102, and with various other computing devices, through suitable communication protocols, interfaces, and networks, including network 114. Further, the merchant device 106 can be any appropriate device operable to send and receive requests, messages, or other types of information over the network 114. Additionally, while only a single merchant device 116 is illustrated in the example of FIG. 1, in some embodiments there can be additional merchant devices depending on the number of merchants participating in the payment service, or a plurality of components arranged as a POS system.

Merchant device 116 can include an instance of a merchant application 118 executed on merchant device 116. Merchant application 118 can provide POS functionality to enable the merchant 122 to accept payments at a POS location using merchant device 116. In some types of businesses, the POS location can correspond to a store or other place of business of the merchant, and thus, can be a fixed location that typically does not change on a day-to-day basis. In other types of businesses, however, the POS location can change from time to time, such as in the case that merchant 122 operates a food truck, is a street vendor, a cab driver, or has an otherwise mobile business, e.g., in the case of merchants who sell items at buyers' homes, buyers' places of business, etc.

Merchant device 116 is communicatively coupled to a payment object reader 120, either by direct connection, for example through an audio jack of the mobile phone connected to an audio plug of the payment object reader, or through wireless connection, such as WiFi, BlueTooth, BLE (Bluetooth low energy), NFC, or other appropriate short-range communication. Short-range communication as used herein refers to communication protocols having a generally short range of communication (less than 100 meters in some embodiments), such as NFC communication, RFID (radio frequency identification) tags, or Wi-Fi, etc. The payment object reader can read data from a magnetic stripe card or an EMV chip-type card and communicate the data to merchant device 116. The payment object reader can also read data from an NFC device and communicate the data to merchant device 116.

Accordingly, merchant 122 and buyer 126 can conduct a POS transaction 124 by which buyer 126 acquires an item or service from merchant 122 at a POS location. The merchant application 118 on merchant device 116 can send transaction information to payment processing system 102, e.g., as the transaction is being conducted at the POS location. In some embodiments, such as if a particular merchant device 116 is not connected to the network 114 and is therefore processing transactions offline, the transaction information can be sent in a batch at a subsequent point in time or using other suitable techniques. In some embodiments, the transaction information can be sent via SMS, MMS, or a voice call.

In some embodiments, payment processing system 102 is configured to send and receive data to and from the user device and merchant device 116. For example, the payment processing system 102 can be configured to send data describing merchants to the user device using, for example, the information stored in the merchant account information database 106. The data describing merchants can include, for example, a merchant name, geographic location, contact information, and an electronic catalogue, e.g., a menu that describes items that are available for purchase from the merchant.

In some embodiments, payment processing system 102 can also be configured to communicate with a computer system of card payment network 112, e.g., MasterCard®, VISA®, etc., over the network, or over a different network, for example, to conduct electronic financial transactions. The computer system of the card payment network can communicate with a computer system of financial institution system 110, e.g., a bank. There can be computer systems of other entities, e.g., the card acquirer, between payment processing system 102 and the computer system of the card issuer.

Payment processing system 102 can then communicate with the computer system of a card payment network 112 to complete an electronic financial transaction for the total amount to be billed to the customer's financial account. Once the electronic financial transaction is complete, payment processing system 102 can communicate data describing the payment transaction to the user device, e.g., an electronic receipt, which can, for example, notify the customer of the total amount billed to the user for the payment transaction with the particular merchant.

In some embodiments payment processing system 102 can also include payment card profiles stored with user accounts in user information database 104. Such payment card profile can utilized for card-less payment transactions wherein a user 122 is not required to present a payment card, and instead can authorize the payment processing system to process a payment to a merchant using a device such as device 128.

The transaction information can include information regarding the time, place, and the amount of each respective transaction, information related to the item acquired, payment card information, as well as additional information, such as buyer information. For instance, the transaction information can include data stored in the payment card, e.g., magnetic stripe or integrated circuit data (cardholder name, card number, and other card information). In addition, when completing the transaction a buyer can sometimes provide a receipt email address for receiving a receipt through email. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), data describing a buyer, any type of data that is received upon a buyer's authentication into a social network, if any, and various other types of information.

To accept electronic payments using the POS system 100, the merchant 122 typically creates a merchant account with payment processing system 102 by providing information describing the merchant including, for example, merchant name, contact information (e.g., telephone numbers, the merchant's address, and one or more financial accounts to which funds collected from buyers will be deposited). This merchant information can be securely stored by payment processing system 102, for example, as merchant account information 106 in a secure database. Further, the merchant information can include a merchant profile created for each merchant. The merchant profile can include information about merchant 122 and transaction information associated with transactions conducted by the merchant.

Payment processing system 102 enables a service provider to provide a payment service in which merchants 122 are able to conduct POS transactions 124 with a plurality of buyers 126, such as for selling services and/or products to the buyers 126. The payment processing system 102 can include one or more servers that are configured to process secure electronic financial transactions, e.g., payment during a POS transaction 124, by communicating with the merchant device 116, card payment networks 112, and bank or other financial institution payment systems 110. Payment processing system 102 includes payment processing module 108 that receives transaction information for processing payments made through merchant application 118. For example, the payment processing module 108 can receive transaction information, such as an amount of the transaction, and can verify that particular payment card 130, 132 can be used to pay for the transaction, such as by contacting a card clearinghouse of card payment network 112. Furthermore, in some examples, payment processing module 108 can redirect payment information for transactions to be made using payment cards 130, 132 to a bank, or other financial institution system 110. In other embodiments, merchant device 116 can communicate directly with an appropriate card payment network 112 or financial institution system 110 for approving or denying a transaction using a particular payment card 130, 132 for a POS transaction 124.

As introduced above, payment processing system 102 can be configured to communicate with one or more systems of card payment network 112 (e.g., MasterCard®, VISA®, etc) over network 114 to conduct financial transactions electronically. Payment processing system 102 can also communicate with financial institution system 110 of a bank over network 114. For example, the payment processing system 102 can communicate with an acquiring bank, a payment card issuing bank, and/or a bank maintaining buyer accounts for electronic payments. In some embodiments, financial institution system 110 can include one or more bank payment systems 110 of one or more banks.

A payment card acquiring bank can be a registered member of a card association (e.g., Visa®, MasterCard®, etc), and can be part of card payment network 112. A payment card issuing bank can issue payment cards 130 and 132 to buyers 126, and can pay acquiring banks for purchases made by cardholders to which the issuing bank has issued payment card 130 and 132. Accordingly, in some embodiments, the systems of an acquiring bank can be included in the card payment network 112 and can communicate with systems of a payment card issuing bank to obtain payment. Further, in some embodiments, financial institution system 110 can include systems associated with debit card issuing institutions, in which case, the systems of the debit card issuing institution can receive communications regarding a transaction in which the buyer uses a debit card instead of a credit card. Additionally, there can be systems of other financial institutions involved in some types of transactions or in alternative system architectures and thus, the foregoing are merely several examples.

Network 114 can be a conventional type, wired or wireless, and can have numerous different configurations including a star configuration, token ring configuration, or other configurations. Furthermore, network 114 can include an intranet, a local area network (LAN), a wide area network (WAN) (e.g., the Internet), and/or other interconnected data paths across which multiple devices can communicate. In some embodiments, network 114 can be a peer-to-peer network. Network 114 can also be coupled with or include portions of a telecommunications network for sending data using a variety of different communication protocols. In some embodiments, network 114 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 114 coupled to the merchant device, payment processing system, card payment network, and bank, more than one network 114 can connect these entities. The payment system, the merchant device, and the user device can communicate over the network using wired or wireless connections, or combinations thereof.

In some embodiments, payment processing system 102 is configured to accept card-less payment transactions from customers (e.g. customer 126). As used herein, a card-less payment transaction is a transaction conducted between the customer and a merchant at the point-of-sale during which a financial account of the customer is charged without the customer having to physically present a financial payment card to the merchant at the point-of-sale. In some forms of card-less payment transactions, the merchant receives at the point-of-sale details of the financial account via mobile device 128 presenting payment information to merchant 122 by communicating with payment object reader 120, e.g. NFC transactions. In other forms of card-less payment transactions, the merchant need not receive any details about the financial account at the point-of-sale, e.g., the credit card issuer or credit card number, for the transaction to be processed. Instead, such details can be stored at user information 104 of payment processing system 102 and provided to merchant 122 (such card-less payment transactions herein are referred to as card-on-file transactions). Generally, when a customer and a merchant enter into an electronic financial transaction, the transaction is processed by transferring funds from a financial account associated with the user account to a financial account associated with the merchant account.

Before conducting card-less payment transactions of the type that does not require that the merchant POS receive financial account details from customer 126 (e.g. card-on-file transactions), the customer typically creates a user account with the payment system. The customer can create the user account, for example, by interacting with a user application that is configured to perform card-less payment transactions and that is running on the user device. When creating a user account with the payment system, the customer will provide information of the customer, data describing a financial account of the customer, e.g., credit card number, expiration date, and a billing address. This user information can be securely stored by the payment system, for example, in a user information database. To accept card-less payment transactions, the merchant typically creates a merchant account with the payment system by providing information describing the merchant including, for example, a merchant name, contact information, e.g., telephone numbers, the merchant's geographic location address, and one or more financial accounts to which funds collected from users will be deposited. This merchant information can be securely stored by the payment system, for example, in a merchant information database.

As used herein, the term "payment card," "payment object," or "payment instrument" refers to a payment mechanism which includes a debit card, a conventional credit card, "smartcards" that have embedded circuits, such integrated circuit (IC) cards (e.g., Europay-MasterCard-Visa (EMV) cards), and NFC enabled payment cards, or any wallet-size card which functions as a combination of any of these payment mechanisms. In some embodiments, a payment card, payment object, or payment instrument can also include a virtual payment card stored on a device such as a smart phone or other device and transmittable, for example, via near field communication (NFC) or other suitable means.

Figure 2:
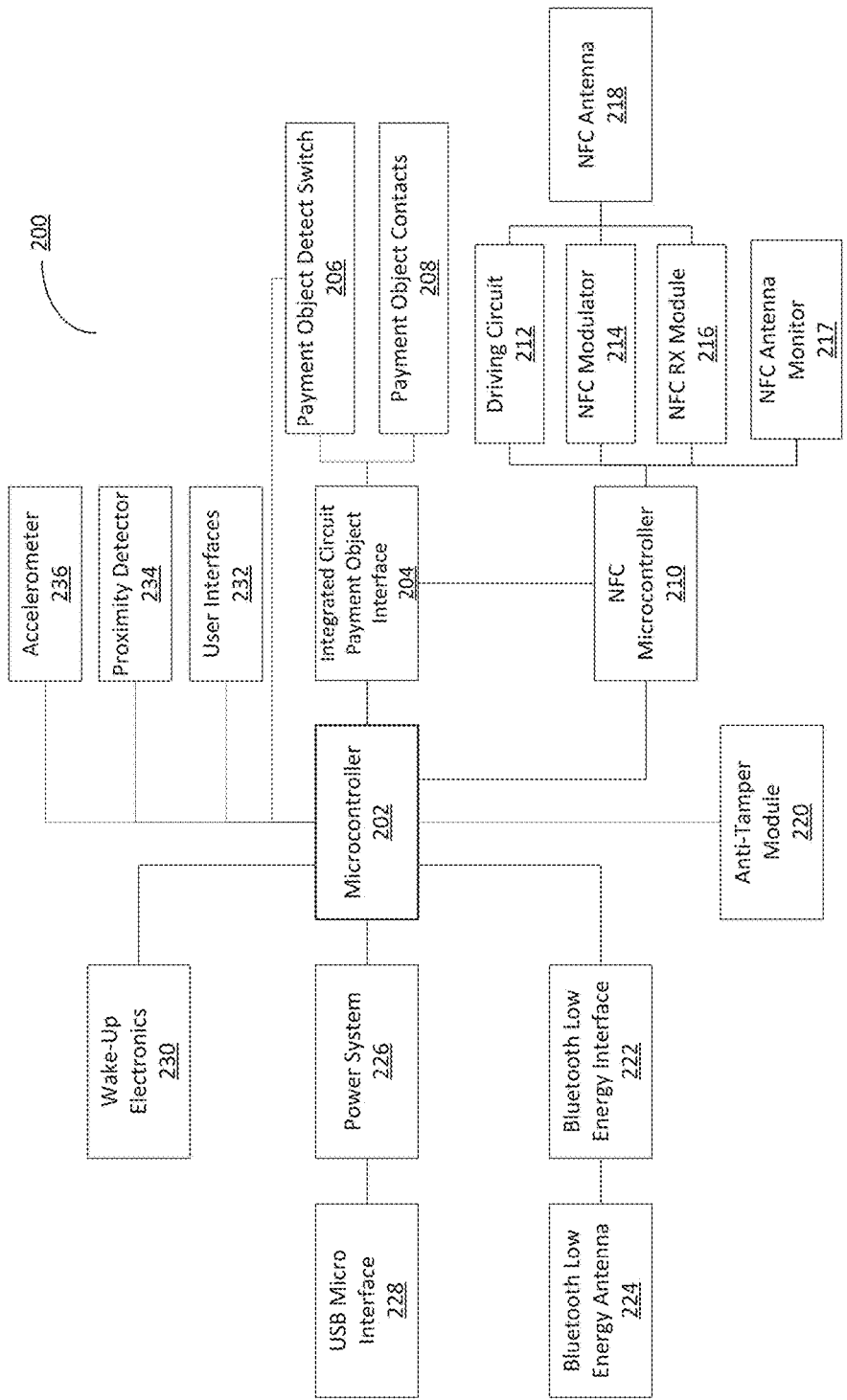
FIG. 2 illustrates an example block diagram of a payment object reader for performing transactions between merchants and buyers.

FIG. 2 illustrates a payment object reader/transmitter device 200 in accordance with at least some embodiments of the present invention. Payment device 200 includes microcontroller 202 configured to manage functions between various components within the device. Coupled to microcontroller 202 is integrated circuit payment object interface 204. Integrated circuit payment object interface 204 is connected to payment object detect switch 206 and payment object contacts 208. Payment object contacts 208 is configured to provide electrical connectivity between the contact pads of an integrated circuit enabled payment object and integrated circuit payment object interface 204. Furthermore, payment object detect switch 206 is configured to indicate when a payment object is inserted into payment device 200. Payment object detect switch 206 may be any suitable switch, electrical, mechanical, or otherwise, and in some embodiments may be integrated with payment object contacts 208. In situations where payment object detect switch 206 indicates that a payment object has been inserted into payment device 200, integrated circuit payment object interface 204 creates a pathway between microcontroller 202 and payment object contacts 208. As such microcontroller 202 can read data from the payment object contacting payment object contacts 208.

Figure 3:
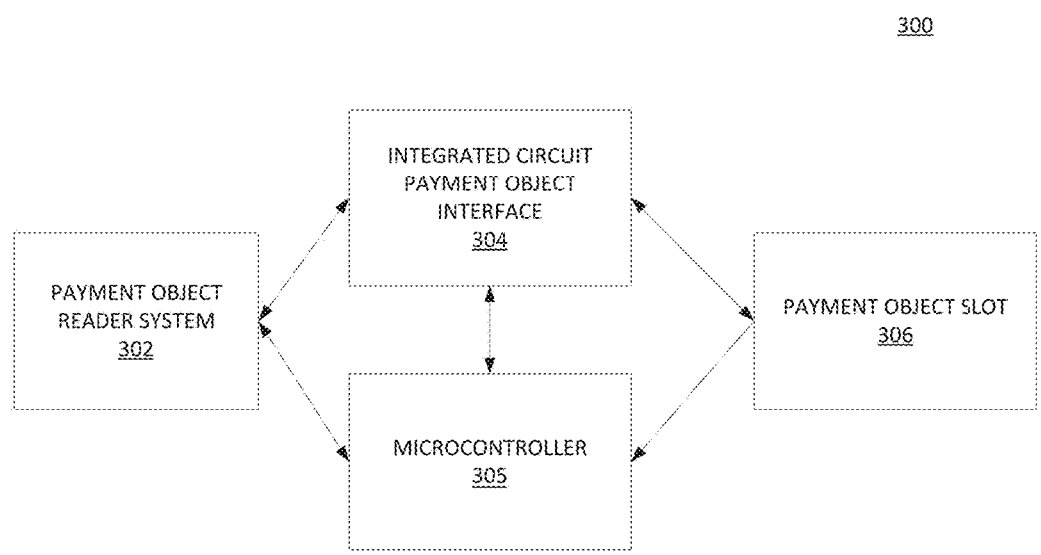
FIG. 3 illustrates an example block diagram of the microcontroller intercept of an integrated circuit payment object contact switch system.

In some situations, microcontroller 202 monitors and determines that the various components and subsystems of payment device 200 is not ready to read a payment object in contact with payment object contacts 208. In such situations, microcontroller 202 can delay the reading of the payment object in contact with payment object contacts 208. FIG. 3 illustrates a generalized schematic view of the components used to carry out this function.

In some embodiments, microcontroller 202 transmits the data read from the payment object contacting payment object contacts 208, by using the NFC antenna 218 under the control of the NFC microcontroller 210.

Payment device 200 may also include a near field communication (NFC) microcontroller 210. NFC microcontroller 210 is configured to manage the transmission and reception of near field communications through control of driving circuit 212, NFC modulator 214, NFC RX module 216, NFC antenna monitoring circuit 217, and NFC antenna 218. In some embodiments, driving circuit 212 may include an H-bridge, an amplifier, a filter and/or a matching circuit. A switch 213 can be coupled on a first pole of the switch to the antenna 218 and on the second pole to the driving circuit, such that when the device is in the first receiver mode, the switch 213 is closed and the antenna is driven by the driving circuit. When switch 213 is open, the antenna 218 is not driven by driving circuit 212 and operates in a transmission mode. In some embodiments, switch 213 can be replaced with a switch within driving circuit 212, such as a JFET or MOSFET switch under the control of the microcontroller 202 or NFC microcontroller 210. Furthermore, in some embodiments NFC RX module 216 may include an op-amp, a filtering and conditioning circuit and/or a rectifier, such as a full wave bridge rectifier. Additionally, NFC modulator 214 may be, for example, a type-B modulator. In instances where it is desired to read a NFC enabled payment object, or a NFC enabled payment object is determined to be in proximity to payment device 200, NFC microcontroller 210 may be configured to drive NFC antenna 218 via driving circuit 212 to induce a magnetic field capable of being modulated by the NFC enabled payment object. From here, the modulated magnetic field signal may be converted into a digital signal that NFC microcontroller 210 can interpret via NFC RX module 216. On the other hand, when it is desired to transmit data via NFC antenna 218, NFC microcontroller 210 may be configured to disable driving circuit 212 and transmit data using the NFC protocol by instructing NFC modulator 214 to modulate the magnetic field to which NFC antenna 218 is operatively coupled. In some embodiments, there can be a switch within NFC modulator 214 to turn on or off the load applied to the antenna. The switch can be under the control of microcontroller 202. In some embodiments NFC antenna 218 can drift from a desired frequency (become detuned). This can be the result of a metal object being in the proximity of device 200. The NFC antenna monitor 217 can monitor the frequency of NFC antenna 218, and determine when the frequency of NFC antenna 218 has drifted away from the desired frequency. When it is determined that NFC antenna 218 is out of tune, NFC antenna monitor circuit 217 can work in concert with NFC microcontroller 210 to vary one or parameters such as capacitance, voltage, or impedance of NFC antenna 218 to tune NFC antenna 218.

Microcontroller 202 receives payment data read by integrated circuit payment object interface 204 via payment object contacts 208, or alternatively from a magnetic stripe reader reading payment data from a magnetic stripe card. The payment data received at microcontroller 202 is stored, either temporarily or permanently, in memory of payment device 200. The payment data stored in memory can then be transmitted via NFC antenna 218. In some embodiments, microcontroller 202 can receive and permanently store payment information so that payment device 200 acts as a payment object that does not require a payment card or other payment object to be present. Payment device 200 is capable of communicating using Bluetooth, and is thus able to pair with a mobile device to obtain payment object information from a phone that has Bluetooth capabilities but does not have NFC payment capabilities.

To supply power to the components within payment device 200, power system 226 is provided. In some embodiments, power system 226 may include a battery. Coupled to power system 226 is USB micro interface 228 configured to receive a USB micro jack, although other types of connectors may be utilized. In certain embodiments, connection of a jack to USB micro interface 228 can activate a switch within power system 226 to override power supplied by the battery. This allows for battery power to be conserved for situations where external power cannot be provided. Furthermore, power system 226 may also include a battery charger to allow the battery to be charged when external power is supplied via USB micro interface 228. Payment device 200 also includes wake-up electronics 230 configured to wake-up payment device 200 from a low-power state to an active state in response to detection of a payment object. In some embodiments, wake-up electronics 230 can also power down payment device 200 to a low-power state after a predetermined amount of time or after completion of a communication.

Payment device 200 illustrated in FIG. 2 further contains a Bluetooth low energy (BLE) interface 222 and a BLE antenna 224 to enable Bluetooth communications. In addition, payment device 200 includes anti-tamper module 220 configured to prevent unauthorized tampering with the device and possible theft or interception of payment information. In certain embodiments, anti-tamper module may include a wire mesh enclosed within payment device 200.

Payment device 200 also includes user interfaces 232 to enhance the user experience. User interfaces 232 can include, but are not limited to, LED indicators, buttons and speakers. In some embodiments, speakers and LED indicators can be used to present audio and visual identifiers of transaction and device status. In addition, buttons may be configured to power payment device 200 on or off, operate the device or reset the device.

Payment device 200 also includes sensors. As illustrated in FIG. 2, the example sensors are useful in informing device 200 about its current environment, use, or state. Accelerometer 236 can be used to detect motion of the device 236. In some embodiments, detected motion (acceleration), or lack of detected motion can be interpreted by microcontroller 202 to conclude that payment device 200 is stationary; was stationary and is now in motion, which may indicate it is being moved toward a customer; was in motion and now is stationary, which may indicate that the device is now in a new environment, and the tuning of NFC antenna 218 should be checked; or quick changes in motion might indicate the device is in a merchant's pocket, and the device can go into standby mode.

Similarly, proximity detector 234, can be used to determine that a payment object is coming within range of the antenna, which can be used to activate the integrated circuit payment object interface 204 or power up or increase power output to NFC antenna 218. In some embodiments, proximity detector 234 can be useful in determining that a payment object is too close to the NFC antenna 218 and is causing NFC antenna 218 to be detuned.

In other embodiments, increasing the overall voltage for driving circuit 217 can tune the detuned antenna 218.

FIG. 3 illustrates an example block diagram of the microcontroller intercept of an integrated circuit payment object contact switch system 300 to delay reading of the payment object. FIG. 3 is illustrates a payment object slot 306 that can include a payment object contact interface and a payment object switch. When a payment object is inserted into the payment object slot, the payment object switch is triggered and this can be detected by the integrated circuit payment object interface 304. However, the payment object switch in the payment object slot 306 is also connected to the microcontroller 305, which depending on conditions within the payment object reader system 302 (generally includes devices of the payment object reader needed for reading a payment object and carrying out a transaction, which can also include microcontroller 305), can interfere with the payment object interface's 304 detection of the switch being triggered. When the microcontroller 305 determines that the conditions within the rest of the payment object reader system 302 are favorable for reading an integrated circuit payment object, it can allow the payment object interface 304 to detect the switch being triggered (i.e., a card is present) and initiate communication with the payment object.

Figure 4:
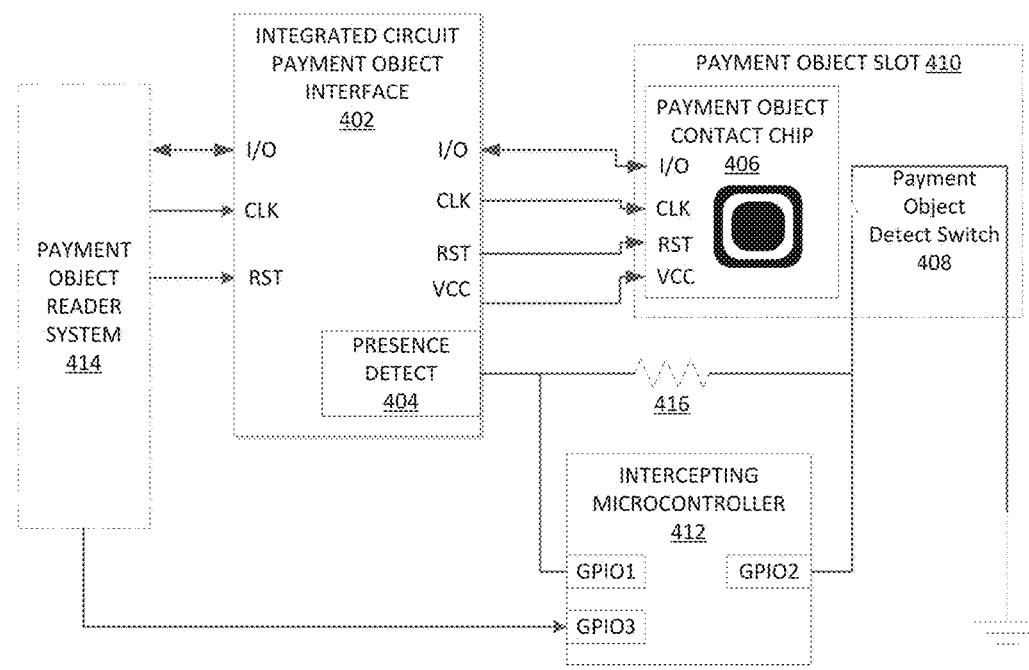
FIG. 4 illustrates an example circuit for the microcontroller intercept of an integrated circuit payment object contact switch.

FIG. 4 illustrates an example circuit for the microcontroller intercept of an integrated circuit payment object contact switch. It provides a more detailed view of the technology illustrated in prior figures. Example circuit 400 of FIG. 4 includes integrated circuit payment object interface 402 with presence detect pin 404, payment object slot 410 and intercepting microcontroller 412.

Payment object reader system 414 similar to payment object reader system 302 includes the various components and subsystems of payment device 200. In some embodiments payment object reader system can include a stand-alone processor, or it can include intercepting microcontroller 412. In other words payment object reader system includes a processor and that processor can be the same processor used to intercept the payment object switch 408, a different microprocessor, or a combination of the two. The payment object reader system 414, through integrated circuit payment object interface 402, is configured to read data from a payment object in payment object slot 410 and payment object contact chip 406 and carry out a transaction.

Integrated circuit payment object interface 402 is connected to payment object contact chip 406. Integrated circuit payment object interface 402, similar to integrated circuit payment object interface 304, is configured to provide supply, protection and control functions between the object and payment object reader system 414. Integrated circuit payment object interface 402 connects all connections within itself when payment object detect switch 408 is triggered by the presence of a payment object in payment object slot 410. As such, payment object reader system 414 is then able to read data from the payment object in payment object slot 410 and in contact with payment object contact chip 406. If integrated circuit payment object interface 402 does not detect that the payment object detect switch 408 has been triggered, the integrated circuit payment object interface 402 disconnects (or does not connect) all connections within itself. As such payment object reader system 414 will be unable to read data from the payment object in payment object slot 410.

Payment object contact chip 406, similar to payment object contacts 208, is configured to provide electrical connectivity between the contact pads of an integrated circuit enabled payment object and integrated circuit payment object interface 402.

Payment object detect switch 408, similar to payment object detect switch 206, is configured to detect the presence of a payment object in payment object slot 410. Payment object detect switch 408 may be any suitable electrical or mechanical switch, and in some embodiments may be integrated with payment object contact chip 406.

The presence or absence of a payment object in payment object slot 410 detected by payment object detect switch 408 is in turn detected at presence detect pin 404 of integrated circuit payment object interface 402. As illustrated in FIG. 4, presence detect pin 404 of integrated circuit payment object interface 402 connects to a first terminal of payment object detect switch 408 and a second terminal of payment object detect switch 408 connects to ground. As such, when payment object detect switch 408 is in an open state (e.g. when the payment object is not in payment object slot 410), a voltage is pulled (e.g. 3.3V) from presence detect pin 404 of integrated circuit payment object interface 402—this is a high voltage state. However, when payment object detect switch 408 is in a closed state (when the payment object is in payment object slot 410), the voltage from the presence detect pin goes to ground (0V)—this is a low voltage state.

Depending on the state of payment object detect switch 408 will indicate how integrated circuit payment object interface 402 responds. For example, the presence of an object in payment object slot 410 will close payment object detect switch 408. In turn, integrated circuit payment object interface 402 at presence detect pin 404, detects the closing of payment object detect switch 408. When integrated circuit payment object interface 402 detects the closing of payment object detect switch 408, integrated circuit payment object interface 402 connects all connections within itself to allow payment object reader system 414 to read data of a payment object in contact with payment object contact chip 406. However if payment object detect switch 408 is in an open state (the payment object is not in payment object slot 410), integrated circuit payment object interface 402 disconnects all connections within itself to disconnect any pathway between the payment object reader system 414 and payment object contact chip 510.

In some embodiments, as illustrated in FIG. 2, a microcontroller (similar to microcontroller 202) is the intermediary between the integrated circuit payment object interface 402, intercepting microcontroller 412 and the remaining components and subsystems of a payment object reader (such as payment device 200).

Intercepting microcontroller 412 is configured to delay the reading of data of the integrated circuit payment object in payment object slot 506, by monitoring payment object reader system 414 and payment object detect switch 408. As illustrated in FIG. 4, intercepting microcontroller 412 can include three general purpose input/output pins—GPIO1, GPIO2 and GPIO3. Two of the general purpose input/output pins (GPIO1 and GPIO 2) connect to the same voltage line connecting at presence detect pin 404 of integrated circuit payment object interface 402 and the first terminal of payment object detect switch 408. The third general purpose input/output pin (GPIO3) monitors payment object reader system 414. In some embodiments GPIO3 of intercepting microcontroller 412 is connected to a microcontroller, similar to microcontroller 202, configured to manage functions between various components and subsystems within the payment object reader.

One of the general purpose input/output pins connected to the same voltage line connecting presence detect pin 404 and the first terminal of payment object detect switch 408, can be configured to monitor the state of payment object detect switch 408 or be in a high impedance state (herein as forth described as the "input line"). When payment object detect switch 408 is in an open state, intercepting microcontroller 412, at the input line, will detect a high voltage state at presence detect pin 404 (e.g. 3.3V). When payment object detect switch 408 is in a closed state, intercepting microcontroller 412 at the input line, will detect a low voltage state at presence detect pin 404 (e.g. 0V).

The other general purpose input/output pin connected to the same voltage line connecting presence detect pin 404 and the first terminal of payment object detect switch 408, can be configured to receive a voltage, be in a high impedance state or output a voltage (herein as forth described as "input/output line"). The configuration of the input/output line of intercepting microcontroller 412 depends on the state of the system of payment object reader 414.

In some situations, when the object is in the object slot of the payment object reader, the payment object reader automatically reads data from the integrated circuit payment object. However the system of the payment object reader may not be ready to read the object in the object slot of the payment object reader. For example, when the object is in the object slot and the system of the payment object reader is not ready, voltage is unnecessarily applied to the integrated circuit. Since the system of the payment object reader is not ready to read the object, the applied voltage is wasted and reading errors can occur.

Instead, it may be desirable to delay the reading of the object in the object slot of the payment object reader, until the system of the payment object reader is ready to read the object. For instance, in one embodiment, intercepting microcontroller 412 delays the reading of the payment object in payment object slot 410. When the payment object is inserted into payment object slot 410 and payment object detect switch 408 closes, intercepting microcontroller 412 also detects the change in states of payment object detect switch 408. For instance, the input line of intercepting microcontroller 412 detects the change in voltage states at presence detect pin 404 from a high voltage state to a low voltage state (e.g. from 3.3V to 0 V). Meanwhile intercepting microcontroller 412 detects the state of the payment object reader system 414. In some embodiments, intercepting microcontroller 412, detects the state of the payment object reader system 414, after detection of the changed voltage state at payment object detect switch 408. If payment object reader system 414 is not ready to read the payment object, the input/output line of intercepting microcontroller 514 outputs a voltage. The outputted voltage will be similar to the high voltage state or the open state of payment object detect switch 408 (e.g. 3.3V). In turn, integrated circuit payment object interface 402, at presence detect pin 404, detects a voltage similar to if the payment object detect switch 408 were open. As a result integrated circuit payment object interface 402 disconnects all connections within itself to prevent microcontroller payment object reader system 414 from attempting to read payment object in payment object slot 410.

Once the system of the payment object reader is ready to read the payment object already in payment object slot 410, the input/output line of intercepting microcontroller 412 stops outputting the voltage. Instead, the input/output line of intercepting microcontroller 412 outputs a voltage to mimic the low voltage state similar to a closed payment object detect switch 408 (e.g. 0V). In turn, integrated circuit payment object interface 402, at presence detect pin 404, detects a voltage similar to a closed payment object detect switch 408. As a result integrated circuit payment object interface 402 connects all connections within itself, thereby allowing payment object reader system 414 to read the payment object in payment object slot 410.

In some embodiments, the input/output line of intercepting microcontroller 412 continuously outputs a voltage similar to the high voltage state or the open state of payment object detect switch 408. The input/output line of intercepting microcontroller 412 only stops outputting said voltage or outputs a low voltage state, when payment object reader system 414 is ready to read the payment object.

In some situations, the system of the payment object reader is ready to read an object prior to the insertion of the object into the object slot of the payment object reader. For example, as seen in FIG. 4, intercepting microcontroller 412 detects that payment object reader system 414 is ready to read a payment object. In response, intercepting microcontroller 412 configures itself to float or enter a pass-through mode. For instance, in some embodiments, intercepting microcontroller 412 configures both input line and input/output line to be in a high impedance state. Therefore, insertion of payment object into payment object slot 410, triggers payment object detect switch 408 to close and integrated circuit payment object interface 402 at presence detect pin 404 directly detects the closed state of payment object detect switch 408. In other embodiments, intercepting microcontroller 412 configures both the input line and input/output line to only receive a signal. In some embodiments, intercepting microcontroller 412 configures the input/output line to output a voltage similar to a voltage detected at the input line.

In some situations, the payment object reader may have low power. It may be undesirable to attempt reading data from an object inserted into the object slot of a payment object reader because such an attempt will likely cause the system of the payment object reader to abruptly lose power. Therefore it may be desirable to prevent the payment object reader to read the data from an object inserted into the object slot of the payment object reader.

In some embodiments, intercepting microcontroller 514 detects whether payment object reader system 414 has low battery power or is in a low power state. If payment object reader system 414 is in a low power state, the input/output line of intercepting microcontroller 412 outputs a voltage similar to the high voltage state of payment object detect switch 408 when it is open (e.g. 3.3V). As a result, integrated circuit payment object interface 402, at presence detect pin 404, detects the high voltage state (similar to when payment object detect switch 408 were open) and disconnects all connections within itself. As such, when a payment object is later inserted into payment object slot 410, intercepting microcontroller 412 determines whether payment object reader system 414 is still in a low power state.

If payment object reader system 414 is still in a low power state, the input/output line of intercepting microcontroller 412 continues to output the voltage similar to the high voltage state of payment object detect switch 408 if it were open (e.g. 3.3V). However, if payment object reader system 414 is no longer in a low power state (e.g. payment object reader system 414 is connected directly to a power source or its battery is now fully charged), the input/output lien of microcontroller 412 stops outputting the voltage. Instead, the input/output lien of intercepting microcontroller 412 outputs a voltage mimicking the low voltage state similar to when payment object detect switch 408 is closed (e.g. 0V). In turn, at presence detect pin 404 of integrated circuit payment object interface 402, a low voltage state (similar to when payment object detect switch 408 were closed) is detected. As such, integrated circuit payment object interface 402 connects all connections within itself to allow payment object reader system 414 to read the payment object in payment object slot 410.

In other embodiments, intercepting microcontroller 412 only initially determines the power state of the system of payment object reader system 414 only after the payment object is inserted into payment object slot 410.

In some embodiments, a payment object reader is both enabled for contactless payment and reading an object. In some situations, when a payment object, that enabled for contactless payment and has an integrated circuit, approaches the payment object reader, the contactless payment subsystem of the payment object reader becomes active. However if user intends to only use the integrate circuit reader, the contactless payment subsystem is active and unused, and power is wasted. In other situations, the contactless payment subsystem and the integrated circuit payment object reader subsystem cannot be both active at the same time. As such in these situations, an approaching payment object enabled for contactless payment, powers up the contactless payment subsystem of the payment object reader but powers down the integrated circuit payment object reader subsystem. Therefore if the user intends to use to only use the integrate circuit payment object reader subsystem, the integrated circuit payment object reader subsystem will not be ready. In all these situations, it may then be desirable to turn off the contactless payment subsystem under these circumstances.

For example, intercepting microcontroller 412 detects from payment object reader system 414 that a contactless payment subsystem of payment object reader system 414 is active. Soon after, the input line of the intercepting microcontroller 412 detects a payment object has been inserted into payment object slot 410. Since intercepting microcontroller 412 detected an object in payment object slot 410 after detecting an active contactless payment subsystem, intercepting microcontroller 412 instructs payment object reader system 414 to disable the contactless payment subsystem.

Figure 5:
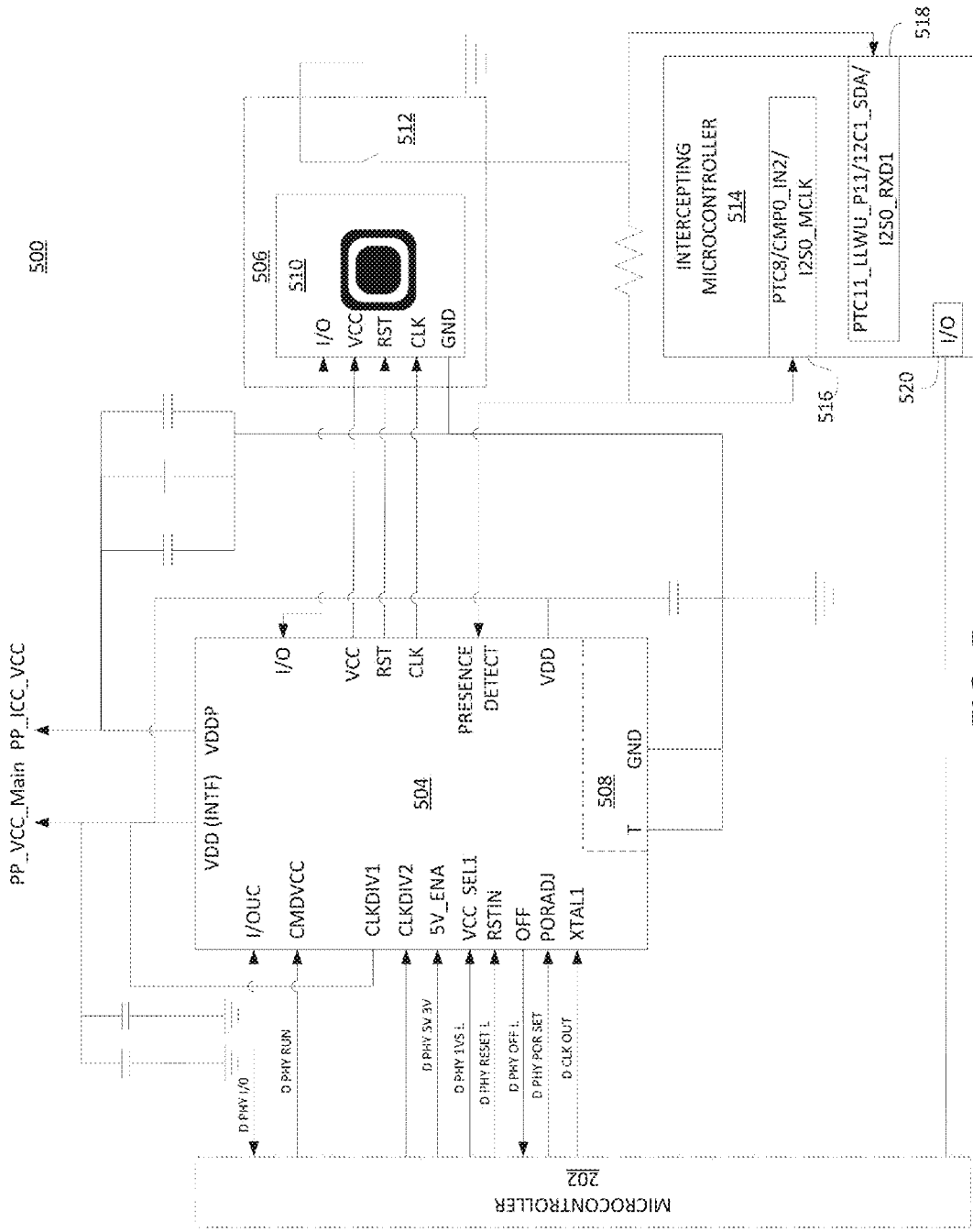
FIG. 5 illustrates a detailed example circuit for the microcontroller intercept of an integrated circuit payment object contact switch.

Reference is now made to FIG. 5. FIG. 5 illustrates a detailed example circuit for the microcontroller intercept of an integrated circuit payment object contact switch. FIG. 5 is a more detailed view of the circuit in FIG. 4. Integrated circuit payment object interface 504 with a presence detect pin corresponds with integrated circuit payment object interface 402 and presence detect pin 404. Payment object slot 410 corresponds to payment object slot 506. Payment object contact chip 510 corresponds to payment object contact chip 406. Payment object detect switch 512 corresponds to payment object detect switch 408. Intercepting microcontroller 514 corresponds to intercepting microcontroller 412. Similarly, the three general purpose input and output pins of intercepting microcontroller 412 correspond to PTC8/CMP0_IN2/I2S0_MCLK, pin 516, PTC11_LLWU_P11/12C1_SDA/I2S0_RXD1 pin 518 and I/O pin 520. FIG. 5 includes microcontroller 202. As disclosed above, microcontroller 202 is configured to manage and monitor functions between various components and subsystems within the payment object reader device. Microcontroller 202 transmits the status of the system of the payment object reader to intercepting microcontroller 514.

Figure 6:
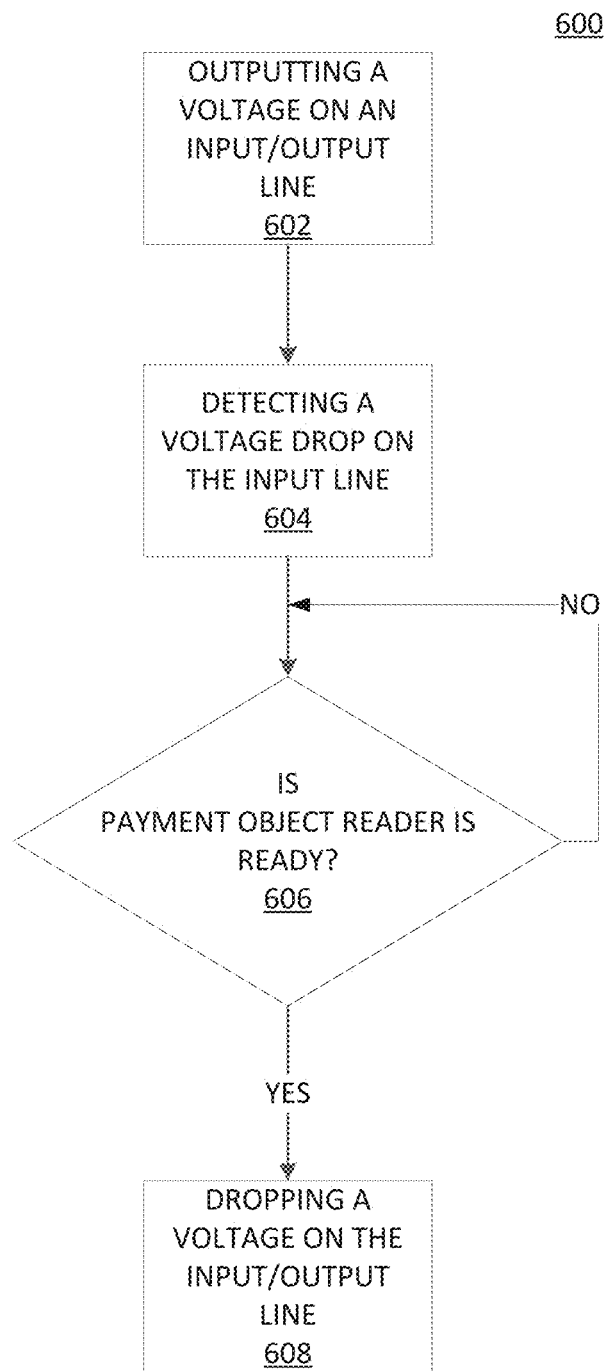
FIG. 6 is an example flow chart of the overall procedure for delaying the reading of an integrated circuit payment object.

FIG. 6 illustrates an example flow chart of the overall procedure for delaying the reading of an integrated circuit payment object. At step 602, a voltage is outputted on an input/output line of an intercepting microcontroller. For example, in FIG. 4, the input/output line of intercepting microcontroller 412 outputs a voltage similar to the high voltage state of payment object detect switch 408 if it were open (e.g. 3.3V). In turn integrated circuit payment object interface 402 detects the high voltage state, and disconnects all connections within itself and prevents payment object reader system 414 from reading the payment object in payment object slot 410.

At step 604, a voltage drop is detected at an input line of an intercepting microcontroller. For example, in FIG. 4, the input line of intercepting microcontroller 412 detects a change in voltage states of payment object detect switch 408. When the payment object is not in payment object slot 410, payment object detect switch 408 is in an open state and a voltage is pulled (e.g. 3.3V) from presence detect pin 404. When the payment object is in payment object slot 410, payment object detect switch 408 is in a closed state the voltage from presence detect pin 404 goes to ground (0V) or drops.

Since the input line of intercepting microcontroller 412 detected a voltage drop, at step 606, it is determined whether the payment object reader system is ready to read a payment object. For example, in FIG. 4, the GPIO3 of intercepting microcontroller 412 detects from payment object reader system 414, the payment object reader system is ready to read a payment object. In some embodiments, intercepting microcontroller 412 determines whether the payment object reader system is ready to read a payment object from another microcontroller (e.g. microcontroller 202).

If the payment object reader system is not ready to read a payment object, then the intercepting microcontroller waits until the payment object reader system is ready. For example, in FIG. 4, from step 606, the intercepting microcontroller 412 at GPIO3 periodically checks to see if payment object reader system is ready to read a payment object. In some embodiments, intercepting microcontroller 412 determines whether the payment object reader system is ready to read a payment object from another microcontroller (e.g. microcontroller 202).

If the payment object reader system is ready to read a payment object, at step, 608, the voltage at the input/output line of intercepting microcontroller is dropped. For example, in FIG. 4, after it is determined that the payment object reader system is ready to read a payment object, the input/output line of intercepting microcontroller 412 stops outputting a voltage. In turn integrated circuit payment object interface 402 detects the drop in voltage and connects all connections within itself, thereby allowing payment object reader system 414 to read the payment object in payment object slot 410. In some embodiments, a microcontroller reads the data from the payment object in payment object slot 410. For instance as seen in FIG. 5, microcontroller 202.

Figure 7:
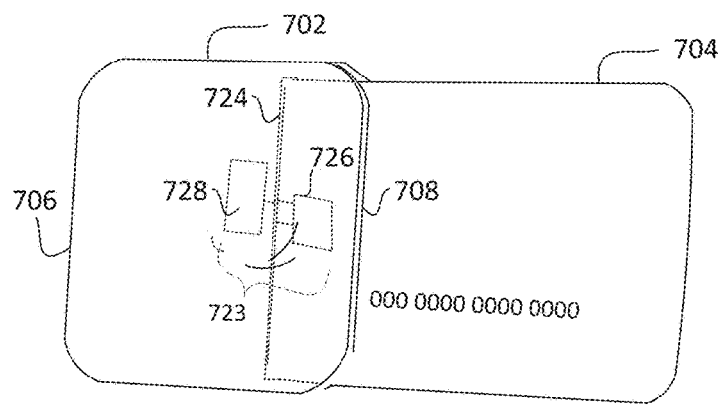
FIG. 7 is an example perspective view of a wireless payment object reader with a smart chip card being inserted.
Figure 8:
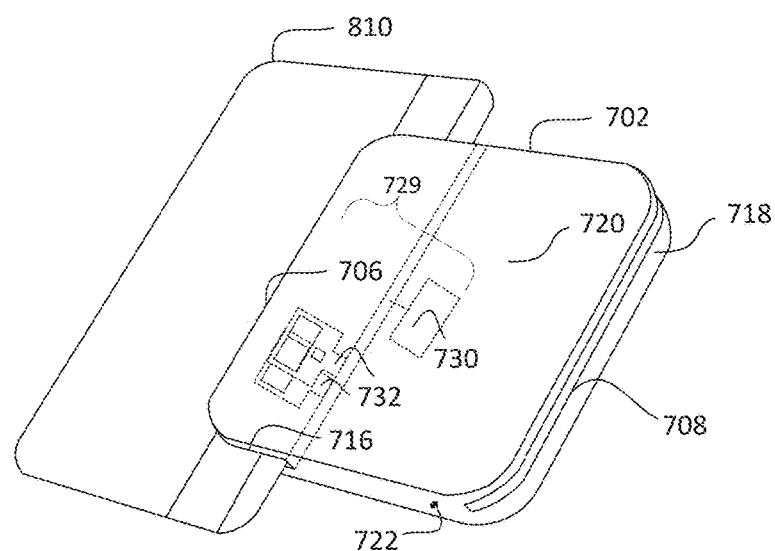
FIG. 8 is an example perspective view of a wireless payment object reader with a magnetic stripe card being swiped.

Reference is now made to FIGS. 7 and 8. FIG. 7 is an example perspective view 700 of a wireless payment device 702 with a smart chip card 704 being inserted at a slot 708 of a chip payment object reader interface 723. FIG. 8 is an example perspective view 812 of a wireless payment object reader 702 with a magnetic stripe card 810 being swiped at a groove 706 of a magnetic stripe reader interface 729 that is opposite to the chip payment object reader interface 723. In some embodiments, the wireless payment device 700 may omit groove 706 and associated magnetic stripe reader interface 729, and provide a single slot 708 for receiving IC payment objects.

The wireless payment device 702 can have a frame that is configured to receive card insertions or card swipes. The frame can include a top surface 720, side surfaces 718, and a bottom surface 722. In the implementations shown in FIGS. 7 and 8, the wireless payment device 702 has a frame that is shaped as a thin parallelepiped, e.g., the width of the frame (along the top surface 720) is at least five or ten times the height (along the side surfaces 718). The top surface and bottom surface can be generally shaped as a square or rectangle, e.g., a square or rectangle with rounded edges.

The side surfaces 718 can include one or more openings that receive cards through, respectively, one or more card interfaces. The one or more card interfaces include circuitry, e.g., chip payment object reader circuitry 728 or magnetic stripe reader circuitry 730, configured to read data stored on the card. In some implementations, the wireless payment object reader has two openings on opposite sides of the frame, and a card interface within each opening. In some implementations, the wireless payment device has a single opening with one of the IC interface, or an MSR interface, or both in a same opening.

The wireless payment object reader 702 can include circuitry configured to direct signals from the one or more card interfaces, to communicate wirelessly with a computing device, and to efficiently power the wireless payment object reader 702. The one or more card interfaces of the wireless payment object reader 702 can include both a chip payment object reader interface 723 and a magnetic stripe reader interface 729. In some implementations, the interfaces are on opposite sides of the wireless payment object reader 702 as shown in FIGS. 7-8. In particular, the payment object reader 702 can include both a groove 706 on one side surface of the frame and a slot 708 on an opposite side surface of the frame. The groove 706 can extend across the entire width of the frame, and can be configured to receive a swipe of a magnetic stripe card. The magnetic stripe reader interface 729, including magnetic read heads 732 positioned to read the magnetic information on the stripe of the card as it is being swiped, are positioned in the groove 706. The slot 708 can extend across part, but not all of the width of the frame, leaving one or more thin side walls 724 to constrain the lateral position of a chip card as it is inserted into the slot 708. The chip payment object reader interface 723, including electrical contacts 726 positioned to electrically engage the contacts on the chip card when it is inserted, are positioned in the slot 708.

In alternative implementations, the interfaces are on the same side of the wireless payment object reader 702 and share an opening for receiving smart chip cards and magnetic stripe cards. In some implementations, a spring-loaded gate is included within the slot 808 of a chip payment object reader interface 723. The spring-loaded gate can be configured to engage the electrical contacts 726 with the contacts of a chip card when a chip card is inserted. On the other hand, the spring-loaded gate keeps the electrical contacts 726 recessed so a card being swiped does not engage with the electrical contacts 726.

In some implementations, the chip payment object reader interface 723 is configured to receive an external adapter through the electrical contacts 726. The external adapter can provide power to recharge the wireless payment object reader 702, e.g., by engaging the electrical contacts 726. The external adapter can connect the chip payment object reader interface 723 to a USB port or power supply. The external adapter can also provide software updates to the wireless payment object reader 702.

Figure 9:
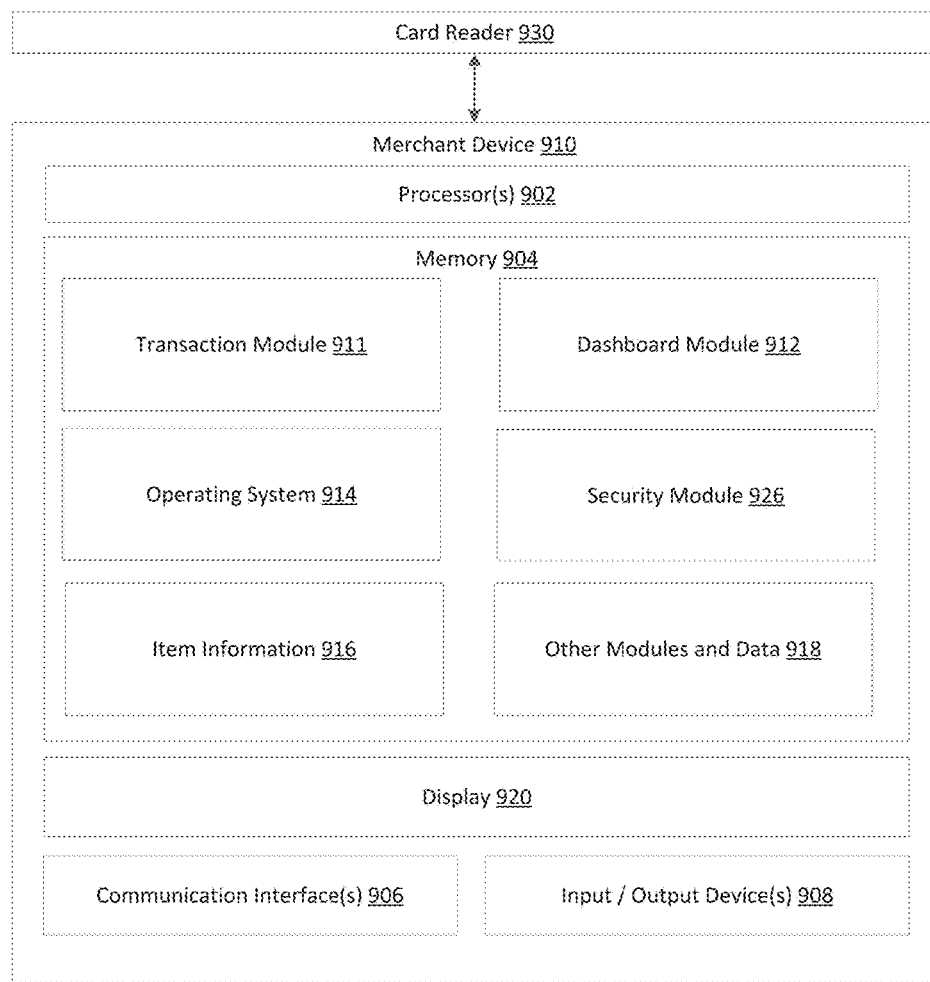
FIG. 9 illustrates an example block diagram of components of a merchant device.

In the example illustrated in FIG. 9, the merchant device 910 includes at least one processor 902, a memory 904, one or more communication interfaces 906, and one or more input/output (I/O) devices 908. Each processor 902 can itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some embodiments, the processor 902 can be one or more hardware processors and/or logic circuits of any suitable type specifically programmed or configured to execute the algorithms and processes described herein by performing various input/output, logical, and/or mathematical operations. The processor 902 can be configured to fetch and execute computer-readable processor-executable instructions stored in the memory 904.

Other components included in the merchant device 910 can include various types of sensors (not shown), which can include a GPS device, an accelerometer, gyroscope, compass, proximity sensor, and the like. Additionally, the merchant device 910 can include various other components that are not shown, examples of which include removable storage, a power source, such as a battery and power control unit, and so forth.

Depending on the configuration of the merchant device 910, the memory 904 can be an example of non-transitory computer storage media (e.g., computer-readable media) and can include volatile and nonvolatile memory and/or removable and non-removable media implemented in any type of technology for storage of information such as computer-readable processor-executable instructions, data structures, program modules or other data. The computer-readable media can include, but is not limited to, RAM, ROM, EEPROM, flash memory, solid-state storage, magnetic disk storage, optical storage, and/or other computer-readable media technology. Further, in some cases, the merchant device 910 can access external storage, such as RAID storage systems, storage arrays, network attached storage, storage area networks, cloud storage, or any other medium that can be used to store information and that can be accessed by the processor 902 directly or through another computing device or network. Accordingly, the memory 904 can be computer storage media able to store instructions, modules or components that can be executed by the processor 902.

The memory 904 can be used to store and maintain any number of functional components or modules that are executable by the processor 902. In some embodiments, these functional components comprise instructions or programs that are executable by the processor 902 and that, when executed, implement operational logic for performing the actions and services attributed above to the merchant device 910. Functional components of the merchant device 910 stored in the memory 904 can include a transaction module 911, a dashboard module 912, and a security module 926, although it can also contain modules or portions of modules assigned herein to the payment processing system 102. The transaction module 911, dashboard module 912 and security module 926 can all be a part of a merchant application, for example merchant application 118, running on merchant device 116. The transaction module 911, for example, presents an interface, such as a payment interface to enable the merchant to conduct transactions, receive payments, and so forth, as well as for communicating with the payment processing system 102 for processing payments and sending transaction information. The dashboard module 912 enables the merchant to manage the merchant's account, the merchant profile, merchant preferences, view saved or new pricing information, communicate with the payment processing system 102 regarding cash advances, offers of incentives, invitations, and the like. The security module 926 can, as described herein, enable the merchant application to encrypt and decrypt transaction information communicated between the merchant device 910 and other system components. Additional functional components can include an operating system 914 for controlling and managing various functions of the merchant device 910 and for enabling basic user interactions with the merchant device 910.

In addition, the memory 904 can also store data, data structures and the like, that are used by the functional components. For example, data stored by the memory 904 can include item information 916 that includes information about the items offered by the merchant, which can include a list of items currently available from the merchant, images of the items, descriptions of the items, prices of the items, and so forth. For instance, when the merchant 122 is setting up the merchant application 118 to accept payments for particular items offered by the merchant 122, the merchant can enter the item information 916 for the particular items. Depending on the type of the merchant device 910, the memory 904 can also optionally include other functional components and data, such as other modules and data 916, which can include programs, drivers, etc., and the data used or generated by the functional components. Further, the merchant device 910 can include many other logical, programmatic and physical components, of which those described are merely examples that are related to the discussion herein.

The communication interface(s) 906 can include one or more interfaces and hardware components for enabling communication with various other devices, such as over the network(s) 114 or directly. For example, communication interface(s) 906 can enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 906 can include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 906 also provides other conventional connections to the network 114 for distribution of files and/or media objects using standard network protocols such as TCP/IP, HTTP, HTTPS and SMTP as will be understood.

The merchant device 910 can further include a display 920, which can employ any suitable display technology. For example, the display 920 can be a liquid crystal display, a plasma display, a light emitting diode display, an OLED (organic light-emitting diode) display, an electronic paper display, or any other suitable type of display able to present digital content thereon. In some embodiments, the display 920 can have a touch sensor associated with the display 920 to provide a touchscreen display configured to receive touch inputs for enabling interaction with a graphical user interface presented on the display 920. Accordingly, embodiments described herein are not limited to any particular display technology. Alternatively, in some embodiments, the merchant device 910 might not include the display 920, and information can be presented by other means, such as aurally.

The merchant device 910 can further include one or more I/O devices 908. The I/O devices 908 can include speakers, a microphone, a camera, and various user controls (e.g., buttons, a joystick, a keyboard, a keypad, etc.), a haptic output device, and so forth.

In addition, the merchant device 910 can include or can be connectable to a payment object reader 930. In some embodiments, the payment object reader 930 can plug in to a port in the merchant device, such as a microphone/headphone port, a data port, or other suitable port, or can communicate via wireless connection to the merchant device. The payment object reader 930 can include a card interface 906 for reading a magnetic stripe or an integrated circuit of a payment card 130, 132, and further can include encryption technology for encrypting the information read from the payment card 130, 132. Alternatively, numerous other types of payment object readers 930 can be employed with the merchant devices 910 herein, depending on the type and configuration of the merchant device 910.

Figure 10:
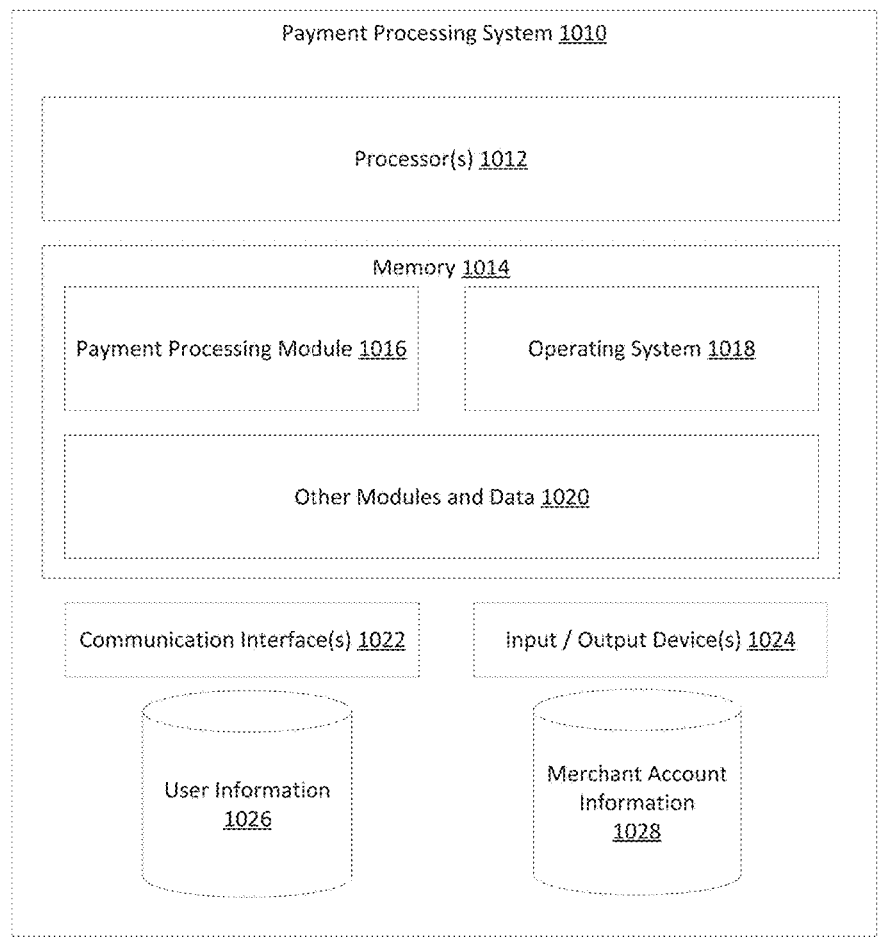
FIG. 10 illustrates an example block diagram of components of a payment processing system.

FIG. 10 is a block diagram illustrating select components of an example payment processing system 1010 according to some embodiments. The payment processing system 1010 can comprise the payment processing system 102 in an example embodiment. The payment processing system 1010 can be any suitable type of computing device capable of sending communications and performing the functions according to the techniques described herein and can be operated by a service provider that provides the payment processing service. For instance, in the case of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the examples herein illustrate the components and data of the payment processing system 1010 as being present in a single location, these components and data can alternatively be distributed across different computing devices and different locations. Consequently, the functions can be implemented by one or more computing devices, with the various functionality described above distributed in various ways across the different computing devices, to collectively implement the payment processing system 1010. Multiple payment processing systems 1010 can be located together or separately, and organized, for example, as virtual servers, server banks and/or server farms. The described functionality can be provided by the servers of a single entity or enterprise, or can be provided by the servers and/or services of multiple different buyers or enterprises.

In the example of FIG. 10, the payment processing system 1010 includes one or more processors 1012, one or more memory devices 1014, one or more communication interfaces 1022, and one or more input/output devices 1024. These components can be similar to those described above with reference to FIG. 1 and elsewhere herein.

The memory 1014 can be used to store and maintain any number of functional components or modules that are executable by the processor 1012. In some embodiments, these functional components comprise instructions or programs that are executable by the processor 1012 and that, when executed, implement operational logic for performing the actions and services attributed above to the payment processing system 1010. Functional components of the payment processing system 1010 stored in the memory 1014 can include the payment processing module 1016, the operating system 1018, and other modules and data 1020. These components can be similar to those described with reference to FIG. 1 and elsewhere herein. In addition, the memory 1014 can store data used for performing the operations described herein. Thus, the memory 1014 can store merchant information 1026, including the merchant profiles. Further, the payment processing system 1010 can include many other logical, programmatic and physical components, of which those described above are merely examples that are related to the discussion herein.

For clarity of explanation, in some instances the present technology can be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A payment object reader comprising:
   a microcontroller; and
   a non-transitory computer readable medium having instructions stored thereon that, when executed, cause the microcontroller to:
   receive a presence detection signal from a presence detector of the payment object reader, the presence detection signal indicating detection by the presence detector that a payment object associated with a customer is present at a payment object reading area associated with the payment object reader,
   detect that a first subsystem of the payment object reader is not ready to read the payment object after receiving the presence detection signal from the presence detector of the payment object reader,
   delay reading of the payment object by the payment object reader until the first subsystem of the payment object reader is ready to read the payment object, and
   signal a payment object reader interface of the payment object reader to read the payment object in response to delaying reading of the payment object until the first subsystem of the payment object reader is ready to read the payment object and after receiving the presence detection signal from the presence detector of the payment object reader.

2. The payment object reader of claim 1, wherein the presence detector includes a mechanical switch, wherein the presence detector detects that the payment object is present at the payment object reading area by detecting that the mechanical switch has switched from a first state to a second state in response to the mechanical switch encountering the payment object at the payment object reading area.

3. The payment object reader of claim 1, wherein the presence detector includes an electrical switch, wherein the presence detector detects that the payment object is present at the payment object reading area by detecting that the electrical switch has switched from an open state to a closed state in response to the electrical switch encountering the payment object at the payment object reading area.

4. The payment object reader of claim 1, wherein the presence detector includes a proximity detector, wherein the presence detector detects that the payment object is present at the payment object reading area by detecting proximity via the proximity detector.

5. The payment object reader of claim 1, wherein receiving the presence detection signal from the presence detector of the payment object reader includes detecting that a voltage at an input line of the microcontroller has changed from a first voltage to a second voltage that is different from the first voltage.

6. The payment object reader of claim 1, wherein signaling the payment object reader interface of the payment object reader to read the payment object includes changing a voltage at an output line of the microcontroller from a first voltage to a second voltage that is different from the first voltage.

7. The payment object reader of claim 1, wherein the payment object is a payment card, and wherein the payment object reading area is a slot.

8. The payment object reader of claim 1, wherein the payment object is a near field communication (NFC) enabled payment object, and wherein the payment object reading area is a range of an NFC interface of the payment object reader interface.

9. The payment object reader of claim 1, wherein the presence detection signal indicates detection by the presence detector that the payment object is an integrated circuit (IC) chip card, and wherein the first subsystem of the payment object reader is at least a portion of an integrated circuit (IC) chip card reader interface, wherein the IC chip card reader interface is at least a portion of the payment object reader interface.

10. The payment object reader of claim 1, wherein the presence detection signal indicates detection by the presence detector that the payment object is a magnetic stripe card, and wherein the first subsystem of the payment object reader is at least a portion of a magnetic stripe card reader interface, wherein the magnetic stripe card reader interface is at least a portion of the payment object reader interface.

11. The payment object reader of claim 1, wherein the presence detection signal indicates detection by the presence detector that the payment object is a near field communication (NFC) object, and wherein the first subsystem of the payment object reader is at least a portion of a NFC object reader interface, wherein the NFC object reader interface is at least a portion of the payment object reader interface.

12. The payment object reader of claim 1, wherein the instructions, when executed, cause the microcontroller to convey power to the first subsystem of the payment object reader in response to receipt of the presence detection signal from the presence detector.

13. A method for facilitating transaction processing using a payment object reader, the method comprising:
receiving a presence detection signal from a presence detector of the payment object reader, the presence detection signal indicating detection by the presence detector that a payment object associated with a customer is present at a payment object reading area associated with the payment object reader;
detecting that a first subsystem of the payment object reader is not ready to read the payment object after receiving the presence detection signal from the presence detector of the payment object reader
delaying reading of the payment object by the payment object reader until the first subsystem of the payment object reader is ready to read the payment object; and
signaling a payment object reader interface of the payment object reader to read the payment object in response to delaying reading of the payment object until the first subsystem of the payment object reader is ready to read the payment object and after receiving the presence detection signal from the presence detector of the payment object reader.

14. The method of claim 13, further comprising conveying power to the first subsystem of the payment object reader in response to receipt of the presence detection signal from the presence detector.

15. The method of claim 13, wherein the first subsystem includes at least a portion of the payment object reader interface.

16. The method of claim 13, wherein presence detection signal indicates detection by the presence detector that the payment object is of a first payment object type of a plurality of payment object types, the plurality of payment object types including a magnetic stripe card type, an integrated circuit (IC) chip card type, and a near field communication (NFC) object type.

17. A payment object reader comprising:
a presence detector, wherein the presence detector detects that a payment object associated with a customer is present at a payment object reading area associated with the payment object reader; and
a payment object reader interface, wherein the payment object reader interface reads the payment object in response to detection by the presence detector that the payment object is present at the payment object reading area and in response to delaying reading of the payment object until a first subsystem of the payment object reader is ready to read the payment object.

18. The payment object reader of claim 17, wherein the presence detector includes a mechanical switch, wherein the presence detector detects that the payment object is present at the payment object reading area by detecting that the mechanical switch has switched from a first state to a second state in response to the mechanical switch encountering the payment object at the payment object reading area.

19. The payment object reader of claim 17, wherein the presence detector includes an electrical switch, wherein the presence detector detects that the payment object is present at the payment object reading area by detecting that the electrical switch has switched from an open state to a closed state in response to the electrical switch encountering the payment object at the payment object reading area.

20. The payment object reader of claim 17, wherein the presence detector includes a proximity detector, wherein the presence detector detects that the payment object is present at the payment object reading area by detecting proximity via the proximity detector.

* * * * *